United States Patent [19]
Koscik

[11] 3,889,909
[45] June 17, 1975

[54] WIRE BUNDLE CENTERING GROMMET
[75] Inventor: Richard A. Koscik, Richton Park, Ill.
[73] Assignee: Illinois Tool Works Inc., Chicago, Ill.
[22] Filed: June 12, 1974
[21] Appl. No.: 478,720

[52] U.S. Cl................ 248/56; 174/153; 248/74 PB; 339/103
[51] Int. Cl....... F16l 5/00; H01b 17/26; H01r 13/58
[58] Field of Search............................... 248/50–56, 248/68, 74, 27; 174/135, 153 R, 153 G; 339/103–107

[56] References Cited
UNITED STATES PATENTS

| | | | |
|---|---|---|---|
| 1,248,207 | 11/1917 | Tyner et al. ........................... | 248/56 |
| 1,727,701 | 9/1929 | Elder, Jr. .............................. | 248/56 |
| 2,948,937 | 8/1960 | Rapata ........................ | 174/153 G X |
| 3,229,026 | 1/1966 | Sulzer .............................. | 174/153 G |
| 3,366,356 | 1/1968 | Fisher .................................... | 248/56 |
| 3,632,069 | 1/1972 | Thayer et al. .......................... | 248/56 |
| 3,749,818 | 7/1973 | Jemison ........................... | 174/153 G |

FOREIGN PATENTS OR APPLICATIONS

| | | | |
|---|---|---|---|
| 557,328 | 11/1943 | United Kingdom............ | 174/153 G |
| 1,153,836 | 3/1958 | France............................ | 174/153 G |
| 1,307,295 | 9/1962 | France............................ | 174/153 G |

Primary Examiner—Marion Parsons, Jr.
Assistant Examiner—Terrell P. Lewis
Attorney, Agent, or Firm—Olson, Trexler, Wolters, Bushnell & Fosse, Ltd.

[57] ABSTRACT

The embodiment of the disclosure disclosed herein is directed to a wire bundle centering grommet and strain relief for use in supporting a plurality of wires or a multi-conductor cable at a spaced location from the periphery of an aperture passing through a wall panel. The centering grommet and strain relief is formed of first and second semi-circular members hinged together at mating edges to form a cylindrical body which is inserted into an aperture in a wall panel. A flange is formed at one edge of the cylindrical body to form a stop-surface. Tabs are formed along the cylindrical body and have a sloping wall facing the flange to accept wall panels of various thicknesses. The tabs are urged inwardly as a result of the inherent resiliency of the cylindrical body when inserting the centering grommet and strain relief into the aperture of the wall panel. Arms extend substantially inwardly and axially of the cylindrical body and are provided with the strap and retainer means to wrap around the wire bundle firmly to hold it in place at a spaced position relative to the periphery of the aperture passing through the wall panel.

7 Claims, 6 Drawing Figures

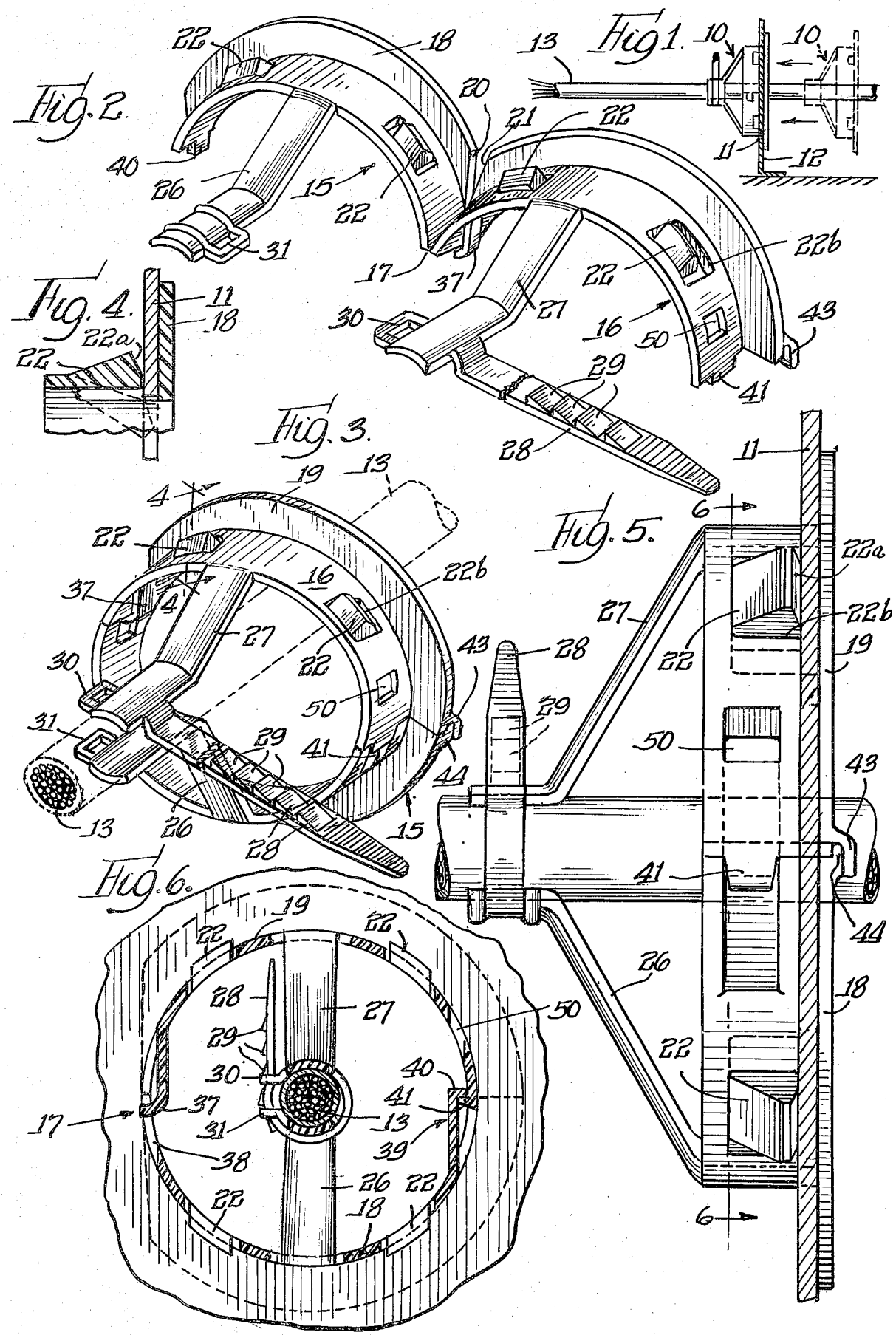

WIRE BUNDLE CENTERING GROMMET

BACKGROUND OF THE INVENTION

This invention relates generally to improvements in the structure of strain relief devices used primarily in the field of wiring and cabling, and more particularly, to a wire bundle centering grommet and strain relief that provides substantial useful improvements over existing similar devices which are now commonly used in the field of cable distribution of electronic and electrical components. However, it will be understood that while this invention is directed particularly to devices used in the field of cabling of electronic circuits and the like, the specific device disclosed herein can be used in other allied fields such as holding plastic and rubber tubing spaced from wall panels as it is routed to various locations.

Heretofore, the use of a strain relief device for holding cables generally required the cables be substantially crimped by the device and the strain relief device inserted, under extreme force, into an aperture formed in a wall panel. While this type of strain relief device is generally sufficient for one, two or three-wire cables it is impractical to use such a device in multiconductor cables having five or more wires. This is particularly true where the multitude of wires are thin such as in a telephone distribution cable.

Furthermore, one of the problems of prior art strain relief devices is that they do not maintain the cable within the center of the aperture passing through the wall panel and therefore there is the possibility of inadvertent cutting of the insulation on some of the wires.

SUMMARY OF THE INVENTION

Accordingly, it is an object of this invention to provide a new and improved wire bundle centering grommet and strain relief device which holds a polarity of conductors of a cable or wire bundle at a spaced position from the periphery of an aperture passing through a wall panel.

Still another object of this invention is to provide a new and improved wire bundle centering grommet and strain relief device which holds the cable or wire bundle substantially fixed in its position relative to a wall panel but allows limited axial movement thereof.

It is still another object of this invention to provide a new and improved wire bundle centering grommet and strain relief device which can be inserted into apertures formed in wall panels of various thicknesses.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a side elevational view of a wire bundle centering grommet and strain relief of this invention showing its use for holding a multi-conductor cable in position relative to a wall panel;

FIG. 2 is a perspective view of the wire bundle centering grommet and strain relief of this invention;

FIG. 3 illustrates the wire bundle centering grommet and strain relief closed about a multi-conductor cable with the retaining strap in the open position;

FIG. 4 is an enlarged fragmentary sectional view taken along line 4—4 of FIG. 3;

FIG. 5 is a side elevational view of the wire bundle centering grommet and strain relief of this invention showing the restraining strap wrapped about the multi-conductor cable; and FIG. 6 is an end view of the wire bundle centering grommet and strain relief of this invention.

DETAILED DESCRIPTION OF THE ILLUSTRATED EMBODIMENT

Referring now to FIG. 1 there is seen a wire bundle centering grommet and strain relief device constructed in accordance as to principles of this invention and designated generally by reference numeral 10. The strain relief device 10 is adapted for insertion into an aperture 11 formed in a wall panel 12 for holding a multi-conductor cable 13 substantially at the center of the aperture 11. While a multi-conductor cable is here illustrated it will be understood that a plurality of discrete conductive wires may be bundled together and held in the same manner. The wire bundle centering grommet and strain relief device is illustrated in phantom line before insertion into the aperture 11.

FIG. 2 illustrates the wire bundle centering grommet and strain relief device of this invention in its open condition and is formed of first and second semicircular members 15 and 16, respectively, which are hinged together at joining edges 17 to form a cylindrical body adapted to be inserted into the aperture 11, as thus seen in FIGS. 5 and 6. A flange 18 is formed on the semi-circular member 14 and a flange 19 is formed on the semi-circular member 16. The flanges 18 and 19 have flat edge portions 20 and 21, respectively, to facilitate opening of the hinged edge portion 17, as best seen in FIG. 2. Also the flange forms a stop surface when the wire bundle centering grommet and strain relief is inserted into the aperture 11. A plurality of tab members 22 extend radially outwardly of the cylindrical body and are axially displaced from the flanges 18 and 19 to receive the wall panel 12 therebetween to firmly hold the cylindrical body in place. Most advantageously, the tab members 22 have a sloping face portion 22a to facilitate receiving wall panels of various thickness.

Extending substantially axially from the cylindrical body are first and second arm members 26 and 27 which area secured to the semi-circular members 18 and 19, respectively, and form means for holding the multi-conductor cable 13. Formed on the arm member 27 is a strap 28 having a plurality of notches 29 formed along its length. Also formed on the arm member 27 is an eyelet or aperture 30. The arm member 26 has an eyelet or aperture 31 and the strap 28 is wrapped about the multi-conductor cable and inserted through the spaced-apart eyelets 30 and 31, as best seen in FIGS. 5 and 6.

The hinged edge portion 17 is formed by a tab 37 which is inserted into an aperture 38 and held in place as result of spring-bias pressure of the tab 37. The cylindrical body is maintained by a clip portion 39 formed along the other mating edges of the semi-circular members 18 and 19 and is held together by overlapping flange portions 40 and 41, as best seen in FIG. 6. To maintain alignment of the flanges 18 and 19 engaging tab portions 43 and 44 are provided.

The multi-conductor cable 13 is firmly held substantially in the center of the wire bundle grommet 10 and a limited amount of axial movement can be obtained by the fact that the arm members 26 and 27 are somewhat resilient. The entire wire bundle centering grommet and strain relief device may be formed of two separate molded plastic parts to form the semi-circular members 18 and 19.

The tab members 22 are secured to the cylindrical body portion only at one edge thereof thereby providing a space 22b around three sides of the tab. This insures that the tab can flex easily downwardly, as seen in the FIG. 4, during insertion of the wire bundle centering grommet and strain relief device 10. Furthermore, an aperture 50 is located immediately adjacent the overlapping flange portions 40 and 41 so that a tool can be inserted to disengage the tab portions if it is desired to remove the strain relief device and open it for disconnection from the cable 13. The semi-circular portions 15 and 16 preferably are formed of plastic material which is molded by any suitable molding technique, such as injection molding or the like.

What has been described is a simple and efficient wire bundle centering grommet and strain relief device which maintains a multi-conductor cable position substantially within the center of the aperture through which it passes. While a single specific embodiment of the invention has been disclosed herein, it will be understood that variations and modifications may be made without departing from the spirit and scope of the following claims.

I claim:

1. A wire bundle centering grommet and strain relief, comprising in combination; first and second semicircular members hinged together at mating edges to form a cylindrical body adapted to be inserted into an aperture formed in a wall panel, a flange formed at one edge of said cylindrical body to abut the peripheral margin about said aperture, tab means extending outwardly of said cylindrical body and displaced from said flange to receive the wall panel therebetween firmly to hold the cylindrical body in place, first and second arm means extending axially from said first and second semicircular members respectively, strap means secured to said first arm means and extending transversely thereof, and fastening means formed on at least one of the said first and second arm means to receive said strap means, whereby said strap means will wrap around and be secured to a bundle of wires passing through said cylindrical body to maintain the bundle of wires centrally of said aperture in said wall panel.

2. The wire bundle centering grommet and strain relief according to claim 1 wherein said first and second arm means have a first portion, diverge inwardly toward the axis passing through said cylindrical body and have a second portion extending substantially parallel to the axis of said cylindrical body, said strap means and said fastening means being formed at said parallel portion thereof.

3. The wire bundle centering grommet and strain relief according to claim 2 wherein said strap means includes a plurality of spaced-apart notches and said fastening means includes aligned aperatures formed in said first and second arm means to receive the said strap and hold it in place by firm engagement with said notches.

4. The wire bundle centering grommet and strain relief according to claim 1 wherein said lock means is formed on said first and second arm means in substantial alignment with one another to receive said strap means for locking said arm means to the periphery of a wire bundle passing therethrough.

5. The wire bundle centering grommet and strain relief as set forth in claim 1 wherein said flange formed on one edge of said body has a cut-off portion on each of said first and second semi-circular members to enable opening of said semi-circular members at said hinged-together mating edge.

6. The wire bundle centering grommet and strain relief as set forth in claim 1 wherein said first and second semi-circular members are hinged together by a tab formed on one of said first and second semi-circular members and a hole formed in the other of said first and second semicircular members for receiving said tab during a hinging motion.

7. The wire bundle centering grommet and strain relief as set forth in claim 1 wherein said strap means have a plurality of spaced-apart notches formed therealong, and said fastening means is formed by the pair of spacedapart apertures to receive said strap means and hold it in place by frictional engagement with said notches.

* * * * *